Dec. 26, 1950     E. P. DUMANOIS ET AL     2,535,532
TWO-CYCLE LOW-BOILING FUEL INJECTION ENGINE
Filed Oct. 29, 1945     3 Sheets-Sheet 1
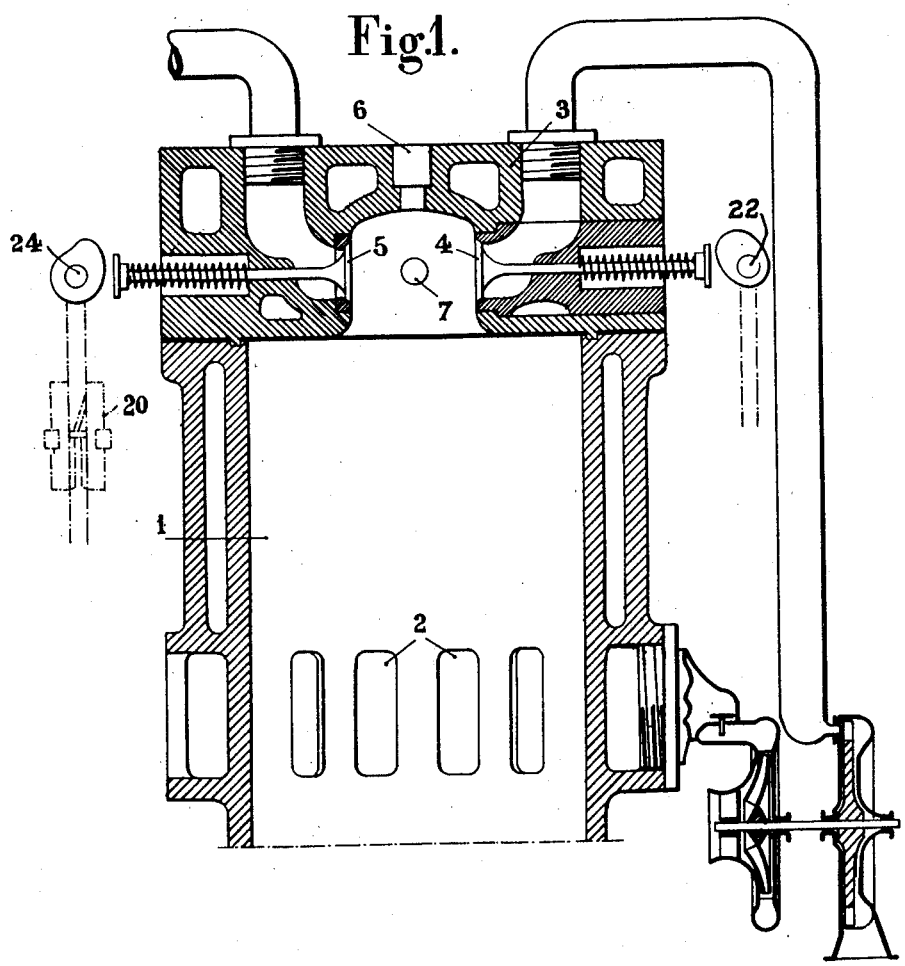
Inventors
EMILE PAUL DUMANOIS
LEON POINCARE
By Haseltine, Lake & Co.
Attorneys Dec. 26, 1950  E. P. DUMANOIS ET AL  2,535,532
TWO-CYCLE LOW-BOILING FUEL INJECTION ENGINE
Filed Oct. 29, 1945  3 Sheets-Sheet 2
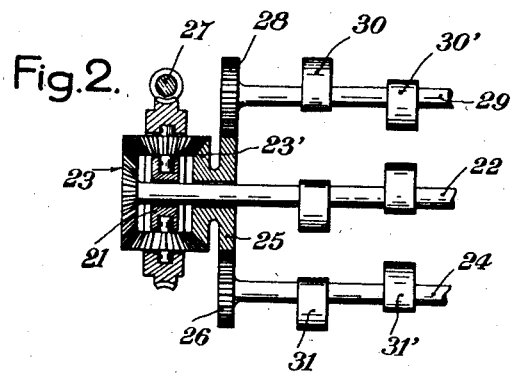
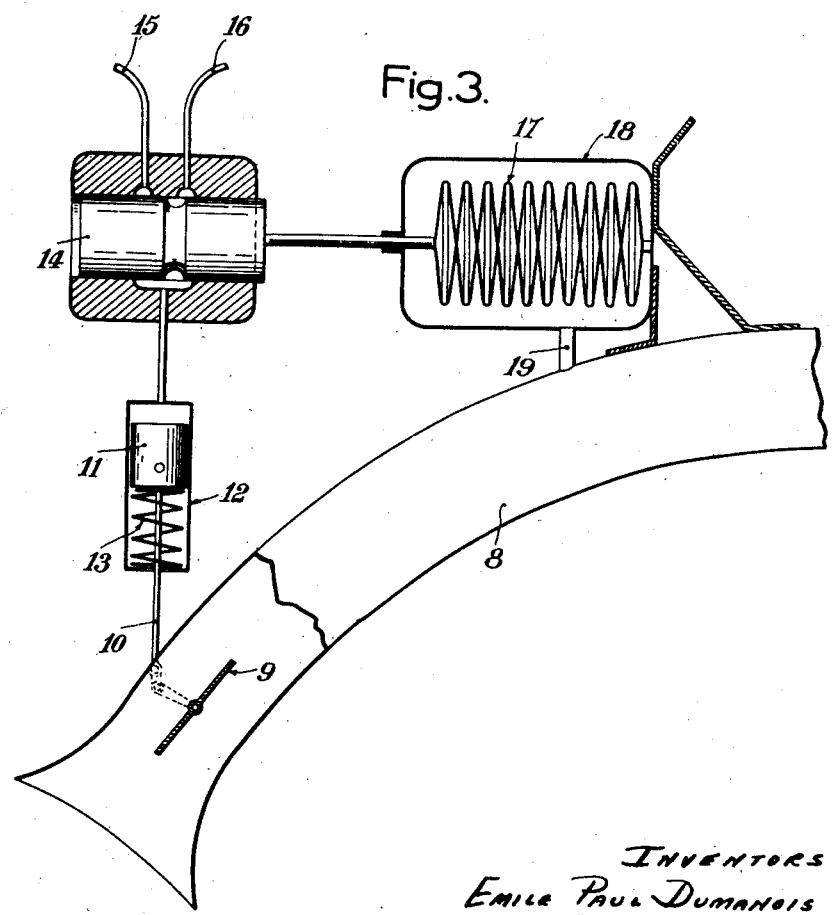
INVENTORS
EMILE PAUL DUMANOIS
LEON POINCARE
BY:
Haseltine, Lake & Co.
AGENTS Dec. 26, 1950 — E. P. DUMANOIS ET AL — 2,535,532
TWO-CYCLE LOW-BOILING FUEL INJECTION ENGINE
Filed Oct. 29, 1945 — 3 Sheets—Sheet 3

Inventors
EMILE PAUL DUMANOIS
LEON POINCARE
By Haseltine, Lake & Co.
Attorneys

Patented Dec. 26, 1950

2,535,532

UNITED STATES PATENT OFFICE 2,535,532

TWO-CYCLE LOW-BOILING FUEL INJECTION ENGINE

Emile Paul Dumanois, Boulogne-Billancourt, and Léon Poincaré, Paris, France, assignors, by mesne assignments, to Office National d'Etudes et de Recherches Aeronautiques (O. N. E. R. A.), Paris, France Application October 29, 1945, Serial No. 625,400
In France September 24, 1941

Section 1, Public Law 690, August 8, 1946
Patent expires September 24, 1961

5 Claims. (Cl. 123—65)

1

Up to the present, difficulties have been encountered in designing two-cycle low-boiling fuel injection engines possessing the desired flexibility and allowing considerable power variations while being economic in operation, whereas such results are obtained very easily in two-cycle engines when fed with a mixture of the combustion-sustaining medium with low-boiling fuel prepared outside the engine, particularly in carburettors, this however being at the cost of efficiency.

On the other hand, low-boiling fuel injection engines possess unquestionable advantages from other points of view.

This invention is concerned with a low-boiling fuel injection engine wherein the advantages of conventional engines of the same type are combined with those of engines fed with a pre-made mixture of combustion-sustaining medium with low-boiling fuel.

According to this invention, the engine is designed in such manner that the amount and pressure of the combustion-sustaining medium admitted into the cylinder can be controlled at any time, automatically or not, in dependency on the load, or on the amount of fuel injected, or on any other suitable variable; that result can be attained notably by altering the moment when, following the scavenging and the filling with fresh fuel and prior to the compression, the cylinder is closed; such closing of the cylinder may notably take place, in full-load conditions, as soon as a sufficient scavenging has been effected, in order that the cylinder may contain a maximum amount of combustion-sustaining medium, to be admitted at the pressure of the compressor where any; or if the load is less said closing of the cylinder may take place a little later so that it may contain a less amount of combustion-sustaining medium at atmospheric pressure; or in low-load conditions it may take place still later with a still less amount of combustion-sustaining medium; or again in all the intermediate positions.

This arrangement can be attained with the aid of a valve whose time of closing can be angularly displaced by any suitable means while running; preferably, said valve is associated with an additional valve to be adjusted once for all and through which the exhaust puff blasts out of the cylinder at the end of the working stroke.

Preferably, the injection of the low-boiling fuel is so controlled that it will begin as soon as both said additional valve and the controlled valve are closed.

Various ways of carrying this invention into effect are diagrammatically shown by way of ex-

2 planatory but in no respect limitary examples in the appended drawing.

Figure 1 is a sectional view taken on the axis of one cylinder.

Figure 2 shows a differential device providing for the angular displacement in the motions of the valves.

Figure 3 illustrates a device for automatically controlling the pressure in the exhaust manifold.

Figure 4:
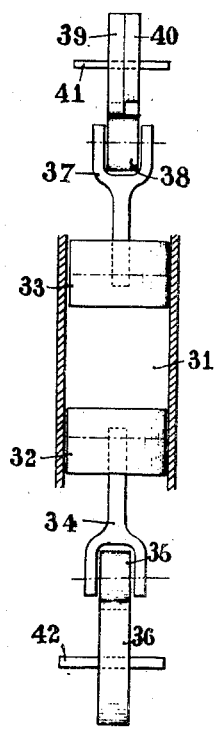
Figures 4 to 6 are diagrams in connection with one way of controlling the injection.

The cylinder 1 has slits 2 therein which serve as inlets for the air delivered by a compressor (not shown) which may or may not be driven by the engine itself. In the specific case of airplane engines said compressor may be driven by an exhaust turbine. The head 3 is equipped with two exhaust valves 4 and 5.

The valve 4 is so adjusted that it will open at a definite fixed value of the crankshaft angle before the piston uncloses slits 2 in order to allow the pressure exhaust puff to flow out. Said valve is closed at a fixed point in the stroke, preferably in the neighborhood of the dead centre.

Valve 5 is set at constant opening point. However, such opening point can be angularly displaced by known means, e. g. a helical sleeve 20 arranged on the cam driving shaft.

Another solution consists in interposing a differential gear between either exhaust orifice control means—camshafts in the case of poppet valves (Fig. 2), second-motion shafts in the case of sleeves, etc.—whose cross-member 21 is locked and which consequently operates as a reversing gear. For instance, the first camshaft 22 which controls the valve 4 will be driven by the first pinion 23 in the differential, and the other shaft 24 by the second pinion 23'. For instance, the pinion 23 is keyed on shaft 22 whereby it will thus be driven directly, while the other shaft 24 arranged in parallelism with the former receives its motion from the second pinion 25 in the differential through a spur wheel 26.

The angular displacement of one camshaft with respect to the other will be obtained by acting through a suitable irreversible control member (a worm spindle 27, a spur or a bevel wheel, etc.) upon the position of cross-member 21 which is retained from moving by this very control member as long as same is not acted upon. Since the first shaft 22 is fast with the motor shaft, its angular position will not vary, whereas the second shaft 24 can optionally receive a lead or a lag with respect to the motor shaft.

Denoted at 6 is the fuel injection nozzle, and at 7 the sparking plug (Fig. 1).

The operation is as follows:

As the piston reaches a definite position in its expansion stroke the valve 4 opens and the exhaust puff blasts out. In the specific case of engines equipped with a turbo-compressor it is the said puff that feeds the turbine with energy. The piston thereafter uncovers the scavenging slits. In full-load conditions the valve 5 will open at that moment and scavenging will take place; the combustion gases flow out past the valves 5 and 4 which may remain still open for a while in order to provide for the cooling of the valve and contingently of the ribs on the turbine where the engine is equipped with a turbo-compressor.

The valve 4 closes when the piston reaches a definite position which is in very close proximity to low dead center. At a suitable moment in the upward stroke of the piston, before the latter reaches the upper edge of the scavenging slits, the valve 5 closes. It follows that after the piston has covered the scavenging slits the air in the cylinder is substantially at the pressure of the scavenging compressor.

Henceforth fuel injection can begin, and ignition takes place with a suitable lead with respect to the upper dead centre.

For a purposed decrease in the charge the control means for valve 5 is to be angularly displaced in order to delay the closing of the same; henceforth the pressure at the end of the filling decreases.

When the setting is such that valve 5 will close at the moment when the piston has just covered the scavenging slits, the air within the cylinder is at atmospheric pressure.

With a further angular displacement a delay is brought about in the closing of the valve, which involves a decrease in the amount present in the cylinder, so that the power is the less as the angular displacement is more considerable.

With interconnection between the control of said valve and that of the pump adjustment through suitable means at the disposal of the man in charge of the engine, it will be possible to obtain a correctly composed combustible mixture.

It is to be noted that in low-load operating conditions, or more specifically from the moment when both the valve 5 and the scavenging slits are open, and all the more after the latter are covered again, the amount of air present in the cylinder at the moment when the latter becomes closed is dependent on the outside pressure. Any substantial variation in the latter involves a corresponding variation in the amount of combustion-sustaining medium present in the cylinder; such is particularly the case with an aircraft engine. This would involve the necessity for the coupling between the control for the closing of the variable set valve 5 and that of the pump adjustment to be influenced by means responsive to variations in the outside pressure, which leads to intricate mechanical arrangements.

Much simpler is to maintain a pressure, beyond the valve 5 and within the exhaust branch pipe, which is substantially constant and equal to the atmospheric pressure at ground level by a device such as diagrammatically illustrated in Fig. 3 and described hereinafter.

Mounted in the exhaust branch pipe 8 leading from valve 5, or from valves 5 in a multicylinder engine, is a throttle 9 which is open when the pressure within said pipe is normal i. e. equal to atmospheric pressure at sea level. Said throttle is actuated by a rod-and-crank system 10 moved by a piston 11 slidably received in a cylinder 12. A return spring 13 tends to keep the throttle in its open position; the cylinder is fed with oil through a piston valve 14 whereby cylinder 12 can be set into communication with either the lubricating oil delivery pipe system 15 or the pipe 16 leading to the lubricating pump feed sump.

The displacement of piston 14 is controlled by the expansion of a bellows 17 filled with air at fixed density, e. g. the one corresponding to ground-level atmospheric pressure at mean temperature. Said bellows is contained in a casing 18 connected with the exhaust pipe 8 through a tube 19.

The operation is as follows: when atmospheric pressure prevails within pipe 8 the piston valve is adjusted to set 12 into communication with 16. As the pressure in casing 18 and around bellows 17 sinks, the bellows 17 expands, the valve piston 14 moves, cuts off 12 from 16 and then connects 12 with 15.

The piston 11 then moves and closes the throttle; when the pressure is restored in 8 it is also restored all around 17 through the medium of 19, whereupon the bellows will tend to return to its initial position, which results in the displacement of 14 and tends to interchange the connections of 12 with 15 and 16. The same movements thus will take place in the reverse order. Hence, the outward flow of exhaust gases is constantly braked as soon as the pressure in casing 18 tends to decrease substantially below the atmospheric pressure for which the control means of the valve have been preset. Such a device can be sensitive enough to maintain in pipe 8 a fairly constant pressure at all operating altitudes.

It is advantageous, in order to facilitate the mixing of the fuel with the air, to let the injection begin as soon as the cylinder is no longer in communication with the outside. In that case the beginning of the injection has to be angularly displaced in dependency on the closing of valve 5. This result can be obtained, as will appear from Fig. 2, by actuating the injection pump pistons by means of cams 30, 30' mounted on shaft 29 which is connected for rotation with shaft 24, carrying the pair of cams 31, 31' for operating the valves 5, through spur gear 26 fixed on shaft 24, differential pinion 25 and spur gear 28 keyed on same shaft 29. As a result, a constant angular timing between the closing of valve 5 and opening of the injection needle will be obtained, the arrangement being such that the smaller the output of the fuel to be injected, the earlier the closing of the valve in relation to the aperture of the needle.

By way of example, such a setting, expressed in degrees beyond the upper dead centre could be obtained as follows:

|  | Full load | Idle running |
|---|---|---|
|  | Degrees | Degrees |
| Opening of valve 4 | 110 | 110 |
| Opening of the upper slits | 120 | 120 |
| Opening of valve 5 | 120 | 180 |
| Closing of valve 4 | 190 | 190 |
| Closing of valve 5 | 220 | 280 |
| Closing of the scavenging slits | 240 | 240 |
| Beginning of fuel injection | 240 | 280 |

Obviously, numerous modifications can be made in the engine as described without thereby departing from the scope of this invention; it is to be understood in particular that although one single cylinder has been shown in the drawing the invention applies notably to multicylinder aircraft engines.

One particular modification consists in allowing the operation of the valve 4 to be angularly displaced by similar means as valve 5 with a view to advance its opening time. A higher power is thus available at the turbine, whereby the scavenging pressure and the engine power can be increased. It has been found that the above described arrangements will allow the engine to be slowed down to 50 and even 45 per cent of its normal speed depending on the setting of the exhaust valve control.

An even more considerable decrease in the engine speed can be obtained as follows:

Since the engine considered is of the injection type, a simple solution appears immediately whereby the gross horse-power can be cut down to one half, by cutting off the injection at every second cylinder. Where the engine, whether it belongs to the radial or the row type, comprises an odd number of cylinders per radial set or row, it will then operate on the four-stroke cycle principle, ignition in each cylinder taking place once every second revolution and the explosions being regularly distributed over two complete revolutions of the crankshaft. In each cylinder a spark-attended power-generating expansion stroke will be followed by a scavenging and a compression, then by a no-spark expansion, a re-scavenging and a re-compression.

Where the engine comprises an even number of cylinders per set or row and the cranks on its crankshaft are uniformly distributed over its circumference, only one half of the cylinders will be operative, while the other half will run idle. However, as far as a row engine is concerned wherein, for the purpose of avoiding any nosing effect, the cranks on the crankshaft are arranged symmetrically with respect to a middle vertical plane like in a four-cycle engine, and wherein consequently in two-cycle operation an explosion in two cylinders at one time, the shifting to four-cycle operation will be effected as in the case of an odd number of cylinders.

Besides, it can be contemplated to cut-off the injection not only at every second cylinder but, following this, at two out of three, or at three out of four cylinders, that is, to let the engine operate on the six- or the eight-cycle principle. The only condition for having all the cylinders operate once every third revolution is that the number of cylinders in each set or row be not a multiple of three, which excludes the nine-cylinder radial engine. As to the conventional 7-cylinder radial airplane engine, it will be able to go over from two-cycle to four-cycle, then to six-cycle and to eight-cycle operation without any difficulty.

It has been found that, taking fuel consumption into account, the solution most suitable is to carry on the delay in the closing of the exhaust up to about 300° and to go over from two-cycle to four-cycle operation and finally directly to eight-cycle operation.

For the purpose of cutting off the injection once every second revolution (cutting-off three times out of four is the same problem repeated twice) one can resort to:

Cutting off fuel suction;
Making the pump inoperative;
By-passing fuel delivery.

All sorts of methods can be devised for securing the said results.

If it be intended to influence fuel suction of delivery one can contemplate for instance to interpose a rotary distributor in the line whereby same will be set once every second time into communication with the atmosphere. Considering the delivery pressures that method does not seem to be adequate in that simple form for by-passing the delivery side, since leakages could occur during the effective injection stroke which might affect the adjustment of the pump.

However, it can also be contemplated to provide the bottom of the pump cylinder with an additional so-called balancing piston and to locate the outlet on the side of the cylinder; as long as the additional piston remains unmovable the pump piston will effectively deliver at every ascending stroke, whereas with a movable balancing piston imparted with the same motion as the pump piston the delivery stroke of the latter will have no effect.

Figure 5:
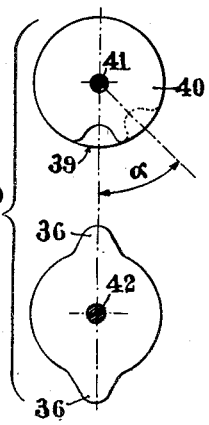

A method amongst other for securing the said result consists in designing the injection pump as follows, reference being had to Figs 4 and 5 of the appended drawing.

The pump barrel 31 is a cylinder open at both ends with a pair of pistons slidably received therein, the one 32 being the pump piston proper and the other 33 the auxiliary so-called balancing piston.

Figure 6:
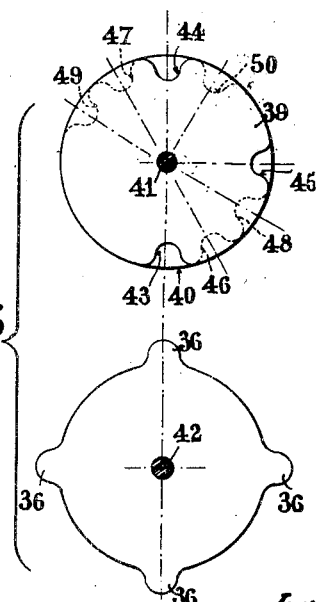

The rod 34 of piston 32 carries a follower 35 which runs on a cam 36; the rod 37 of piston 33 carries a follower 38 that runs on a plate composed of two concentric discs 39 and 40. Each disc has a notch cut therein which is exactly complementary with cam 36. The disc 39, which is rotated by shaft 41 at the same speed as cam 36 that is keyed on a shaft 42 driven at suitable speed by the engine, is set in such manner that follower 38 will engage the related notch exactly at the moment when cam 36 comes into engagement with the pump piston actuating follower 35. Disc 40 also is rotated by shaft 41, but its setting can be adjusted with respect to disc 39, and the notches in discs 39 and 40 can at will be made to coincide or angularly displaced with respect to each other. When the notches have been spaced from each other by such an angle that they have no point in common the balancing piston 33 remains stationary, in which event the pump will operate normally. In the contrary, when the two notches coincide, the balancing piston 33 yields during the delivery stroke of the pump piston 32 and, since the volume comprised between either piston does not change, no injection follows.

Where shaft 42 carries two opposite cams 36 while each disc 39 and 40 has only one notch cut therein (Fig. 5), injection can be cut off once every second time by altering the set of disc 40 with respect to disc 39 by a sufficient angle a.

Where shaft 42 carries four cams 36 spaced by 90° from one another (Fig. 6) and disc 39 is formed with three notches, two of them, 43 and 44, being spaced at 180° from each other and the third one 45 being located therebetween, consequently at 90 degrees' distance, while disc 40 is formed with five notches, four of which, viz.: 46 and 47 on one hand, 48 and 49 on the other hand, being located at the ends of a pair of diameters intersecting an angle a with each other while the fifth notch 50 lies at the end of a diameter intersecting an angle of 90° with diameter 48—49, it will be appreciated that:

1st. Provided no notch in disc 40 coincides with the notches in disc 39, one injection can be afforded by each of the four cams 36, the engine then operating on the two-cycle principle;

2nd. By displacing disc 40 by an angle α to bring notches 46 and 47 into coincidence with notches 43 and 44 in disc 39, two injections can be suppressed out of four, the engine then running on the two-cycle principle;

3rd. Finally, by displacing disc 40 once more by an angle α, the notches 48 and 49 can be brought to coincide with notches 43 and 44 in disc 39 and also notch 50 with notch 45. In that case the only cam 36 will produce an effective stroke, and the engine will run on the eight-cycle principle.

Another injection cutting-off method consists in making the pump inoperative once every second revolution. Providing a change-speed gear for the purpose of cutting down the pump rotational speed by one half to allow the engine to run on the four-cycle principle is not to be thought of. Effectively, on one hand the pump must remain very accurately set, and on the other hand the duration of the injection, i. e. the time taken by the cam to pass by, cannot be cut down; the result would be an insufficient injection pressure with open injection nozzles. However, it can be contemplated to provide for a shifting of the shaft that carries the pump-actuating cams.

By having the shaft carry two cams per pump barrel, one cam in the pair, to be made thinner than the other, can be allowed to escape, the engine thus being shifted from two-cycle to four-cycle operation.

By providing four cams on the shaft the latter can be shifted twice successively, and first two, then three cams allowed to escape in order to shift the engine from two-cycle first to four-cycle and finally to eight-cycle operation.

Figure 7:
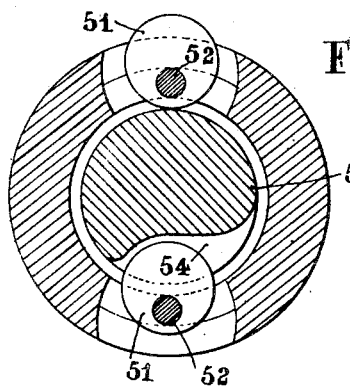
Figure 7 shows a modification of the control means.

It can be contemplated also to enable the cams to retract within the shaft and to keep them erected by an inside locking member formed with suitable inclines to cause them to project from their sockets or to allow them to disappear; the cams then could be designed e. g. as eccentrics 51 (Fig. 7) pivotally mounted on pins 52 while the locking member would consist in the inner shaft 53 formed with the incline 54.

The operating means for controlling the amount of fuel injected at each pump stroke, associated with that for controlling the delay in the closing of the exhaust, which is a continuous control, and the operating means for shifting from two-cycle to four-cycle or to eight-cycle operation, which is a stepwise control, may be separated as are the accelerator pedal and the change-speed lever in a motor-car, or the gas control and the altimetric corrector on an airplane. One can also aim at combining them and for instance a gas lever can be contemplated whose continuous backward displacement over a suitably wide quadrant would correspond to a decrease in the delay in the closing of the exhaust and to a correlative increase in the amount of fuel injected at each pump stroke, while a stepwise side displacement of said lever to shift the same from one quadrant to the adjacent one would correspond to the sudden shifting from two-cycle to four-cycle and later to eight-cycle operation.

On multi-engined machines on which for the sake of convenience the pilot should have all his levers within his hand's reach, the said arrangement would not easily allow shifting one single engine to four-cycle operation while leaving the others running on the two-cycle principle. A sufficient side play should then be provided for each lever; they could not therefore be assembled and as a whole they would have a somewhat too large volume for one hand to clasp them. In these conditions any suitable well-known or other operating means can be used.

What we claim as our invention and desire to secure by Letters Patent is:

1. In a two stroke injection engine comprising at least one cylinder and a piston reciprocable therein, in which said cylinder is of the type with inlet ports uncovered by said piston in its lowest position and communicating with a source of air, and in which said cylinder is provided with two exhaust valves, control means actuated by the motor for opening each said valve for a constant fraction of the motor's cycle, and means for variably shifting the actuation of said control means with respect to one another in accordance with the required power output, the opening of the first said valve beginning slightly before said ports are uncovered and terminating when the piston is in very close proximity to low dead center, and the opening of the second valve beginning at a variable interval of time after said ports are uncovered and terminating at a variable moment, said moment taking place within a space of time extending before and after the moment said ports are closed.

2. In a motor according to claim 1, shifting means comprising: a differential gearing having a carrier inclinable to selective fixed positions, a first planetary wheel driven by the motor and actuating the first valve of each cylinder, and a second planetary wheel actuating the second valve of each cylinder.

3. In a motor according to claim 1 and in which an exhaust driven compressor supplies air through said ports, means for driving said compressor by the exhaust from only the first said valve, the exhaust from the second said valve running out directly into open air through an exhaust pipe.

4. In a motor according to claim 1, fuel injection control means variable with said shifting means to reduce the quantity of fuel injected as the closing of the second valve is increasingly delayed.

5. In a motor according to claim 1, means for maintaining a substantially constant pressure in the exhaust manifold regardless of atmospheric pressure variations, said means including a throttle in the manifold and a pressure operated device responsive to the exhaust pressure in the manifold to close said throttle when the pressure falls and to open it when the pressure rises.

EMILE PAUL DUMANOIS.
LÉON POINCARÉ.

REFERENCES CITED

The following references are of record in the file of this patent:

UNITED STATES PATENTS

| Number | Name | Date |
|---|---|---|
| 1,306,198 | Stanley | June 10, 1919 |
| 1,737,602 | Mahler | Dec. 3, 1929 |
| 1,863,875 | Rabezzana | June 21, 1932 |
| 1,907,696 | Woolson | May 9, 1933 |
| 1,963,780 | DuBois | June 19, 1934 |
| 1,985,528 | Thaheld et al. | Dec. 25, 1934 |
| 2,053,057 | Woolson | Sept. 1, 1936 |
| 2,063,362 | Markeij | Dec. 8, 1936 |
| 2,305,787 | Kales | Dec. 22, 1942 |
| 2,326,329 | Camp | Aug. 10, 1943 |